(12) United States Patent
Chen

(10) Patent No.: US 8,174,337 B2
(45) Date of Patent: May 8, 2012

(54) RADIO FREQUENCY SWITCH FOR USE IN SATELLITE RECEIVERS

(75) Inventor: Keming J. Chen, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1232 days.

(21) Appl. No.: 11/831,136

(22) Filed: Jul. 31, 2007

(65) Prior Publication Data

US 2012/0064823 A1    Mar. 15, 2012

(51) Int. Cl.
*H01P 1/10* (2006.01)
*H04W 40/00* (2009.01)

(52) U.S. Cl. .................................. 333/101; 455/428
(58) Field of Classification Search .............. 333/101, 333/103, 104, 105; 455/13.3, 428
See application file for complete search history.

(56) References Cited

U.S. PATENT DOCUMENTS

| | | | |
|---|---|---|---|
| 3,833,866 A | 9/1974 | Boutelant | |
| 5,428,814 A * | 6/1995 | Mort et al. | 455/12.1 |
| 5,828,268 A * | 10/1998 | Ando et al. | 330/124 D |
| 7,593,703 B2 * | 9/2009 | Wiegner et al. | 455/127.2 |
| 2006/0091972 A1 | 5/2006 | Schultz,Jr. et al. | |

* cited by examiner

*Primary Examiner* — Dean O Takaoka

(57) ABSTRACT

Embodiments of the invention generally provide a radio frequency switch, for example for use in a satellite receiver. The switch includes a plurality of input ports and a plurality of output ports, where output ports independently select signal paths from any of the input ports. The entire switch is embodied in a compact single-board layout. In another embodiment, a satellite receiver includes at least one antenna for receiving a signal from a satellite transponder and a radio frequency switch for selecting the satellite transponder from among a plurality of satellite transponders.

18 Claims, 3 Drawing Sheets

RADIO FREQUENCY SWITCH FOR USE IN SATELLITE RECEIVERS

FIELD OF THE INVENTION

The present invention generally relates to digital satellite hardware, and more particularly relates to satellite receivers employing radio frequency switches.

BACKGROUND OF THE INVENTION

Currently available high-end commercial satellite receivers employing 8×1 radio frequency (RF) switches typically are configured to tune to only one satellite transponder between 950 MHz and 2150 MHz at a time. As such, the satellite receivers cannot change seamlessly from one transponder to another, as may be demanded by customers.

Therefore, there is a need in the art for a radio frequency switch for use in satellite receivers that enables seamless change from one transponder to another.

SUMMARY OF THE INVENTION

Embodiments of the invention generally provide a radio frequency switch, for example for use in a satellite receiver. The switch includes a plurality of input ports and a plurality of output ports, where output ports independently select signal paths from any of the input ports. The entire switch is embodied in a compact, single-board layout.

In another embodiment, a satellite receiver includes at least one antenna for receiving a signal from a satellite transponder and a radio frequency switch for selecting the satellite transponder from among a plurality of satellite transponders. The radio frequency switch includes a plurality of input ports and a plurality of output ports, where output ports independently select signal paths from any of the input ports. The entire switch is embodied in a compact single-board.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a radio frequency (RF) switch for use in satellite receivers. In one embodiment, the RF switch is an 8×2 RF switch that enables seamless change from a first transponder to a second transponder. In a further embodiment still, the RF switch comprises a single, four-layer printed circuit board that is placed and routed carefully for RF frequency impedance control and high isolation among signal paths, making the RF switch compact enough to be incorporated in a satellite receiver having a height of approximately one U rack (1.75 inches). In this case, isolation from undesired ports is measured from approximately 45 dB to more than 70 dB. The DC power supply is a single +5 volts, and the total DC power requirement is measured less than approximately 1.2 watts.

Figure 1:
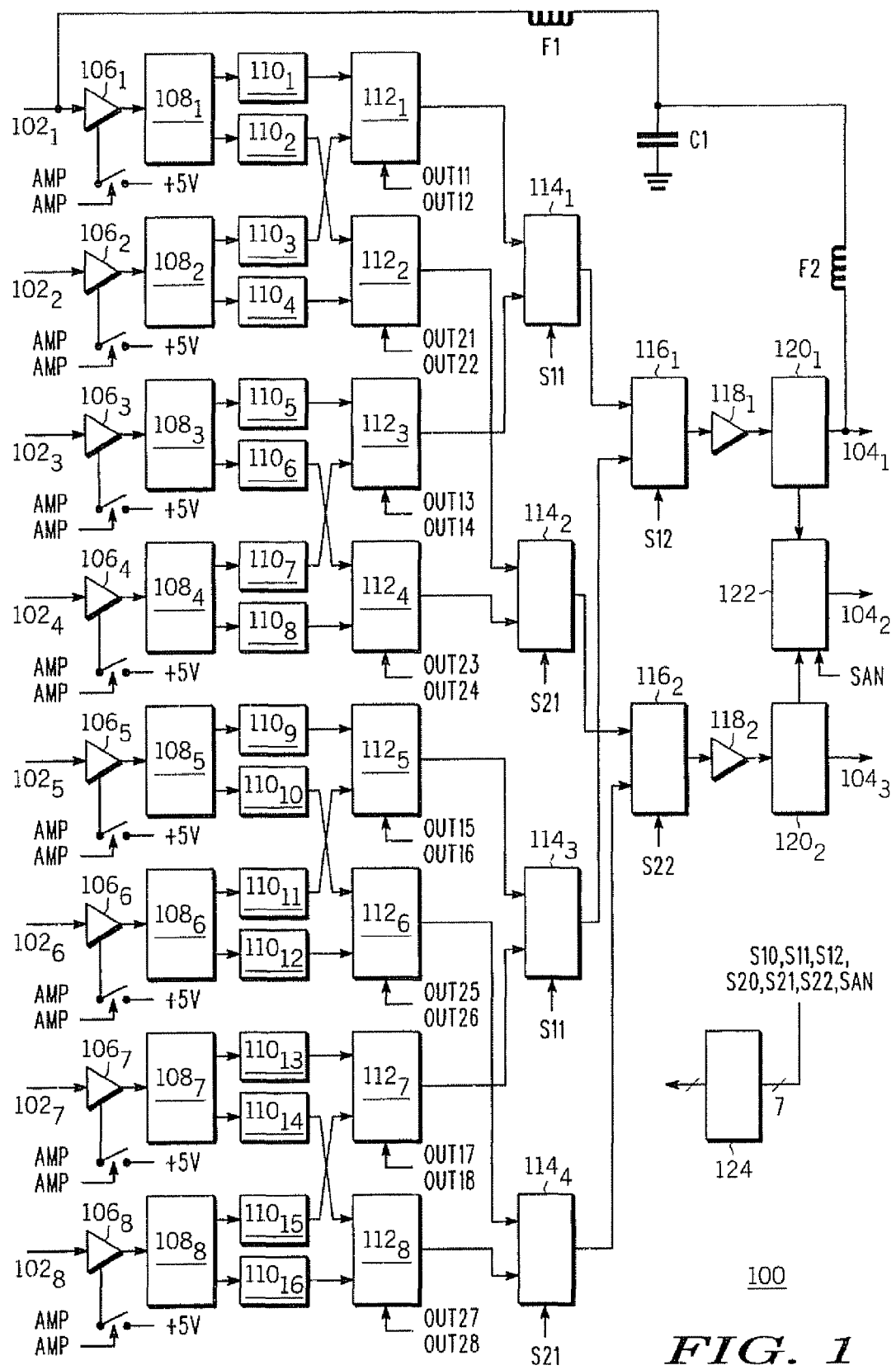
FIG. 1 is a block diagram illustrating one embodiment of a radio frequency switch, according to the present invention.

FIG. 1 is a block diagram illustrating one embodiment of a radio frequency switch 100, according to the present invention. The RF switch 100 may be implemented, for example, in a satellite receiver.

As illustrated, the RF switch 100 comprises a plurality of input ports $102_1$-$102_8$ (hereinafter collectively referred to as "input ports 102") and a plurality of output ports $104_1$-$104_3$ (hereinafter collectively referred to as "output ports 104"). Although the RF switch 100 is illustrated as an 8×2 RF switch having eight input ports 102 and three output ports 104 (two primary and one backup), it will be appreciated by those skilled in the art that other configurations of an RF switch according to the present invention may comprise any number of input ports 102 and output ports 104.

In the illustrated embodiment, each of a first output port $104_1$ and a second output port $104_3$ independently selects one of the input ports 102 for digital satellite services. A third output port, output port $104_2$, selects from the first output port $104_1$ and the second output port $104_3$ as a backup port. In one embodiment, this backup output is coupled to an analog tuner and a demodulator (illustrated in further detail in FIG. 4 at 403 and 404, respectively). As discussed in greater detail below, combination logic is used to select the desired input port 102 for each output port 104. As also discussed below, this same combination logic can be used to turn off unused RF amplifiers in the switch 100.

Each of the input ports 102 is coupled to one of a set of front-end RF amplifiers $106_1$-$106_8$ (hereinafter collectively referred to "amplifiers 106"). In one embodiment, the amplifiers 106 are broadband low-noise amplifiers. In another embodiment, a transient voltage suppressor (not shown) is positioned in front of each amplifier 106 for protection. In a further embodiment, third-order intercept points of the amplifiers 106 are high enough to have low intermodulation products at the strongest multiple-channels input signal. In one embodiment, "low" intermodulation products are at least approximately thirty-five dB below the desired signal levels, in order to reduce interferences.

Each of the amplifiers 106 is in turn coupled to one of a first set of power dividers $108_1$-$108_8$ (hereinafter collectively referred to as "power dividers 108"). The power dividers 108 split the signals from the input ports 102. In one embodiment, each power divider 108 comprises three resistors for wide bandwidth and low cost. The amplifiers 106 compensate for signal power loss due to the power dividers 108.

Each power divider 108 is coupled to a plurality of resistor pads $110_1$-$110_{16}$ (hereinafter collectively referred to as "resistor pads 110"). In one embodiment, different resistor pads 110 are inserted after each power divider 108 to compensate for different lengths of striplines or microstrip transmission lines, so that unity insertion gain (within three dB because of tolerances of components) can be obtained from any input port 102 to any one of the output ports 104 (e.g., over approximately 950 MHz to approximately 2150 MHz). Unity insertion gain will make the switch 100 transparent to tuners in a satellite receiver.

The resistor pads 110 are coupled to three stages of RF switches. A first stage of RF switches $112_1$-$112_8$ (hereinafter collectively referred to as "switches 112") is directly coupled to the resistor pads 110. The first stage of RF switches is in turn coupled to a second stage of RF switches $114_1$-$114_4$ (hereinafter collectively referred to as "switches 114"). The second stage of RF switches is in turn coupled to a third stage of RF switches $116_1$-$116_2$ (hereinafter collectively referred to as "switches 116"). In one embodiment, the switches 112, 114, and 116 in each of the stages are identical. In one embodiment, the switches 112, 114, and 116 are SP2T RF switches. In a further embodiment, the switches 112, 114, and 116 are gallium-arsenide (GaAs) monolithic microwave integrated circuit (MMIC) switches.

The first stage of RF switches 112 comprises as many switches as there are input ports 102. The second stage of RF switches 114 comprises half as many switches as the first stage of RF switches 112, while the third stage of RF switches 116 comprises half as many switches as the second stage of RF switches 114. Thus, each switch in each stage receives the output of two switches in the immediately previous stage (e.g., in the embodiment illustrated in FIG. 1, switch $114_1$ of the second stage receives the output of switches $112_1$ and $112_3$ of the first stage). Thus, the three stages of switches determine which input port 102 will pass through to which output port 104.

The switches 112, 114, and 116 are controlled by logic signals from outputs of two three- to eight-line logic decoders (denoted generally as 124 in FIG. 1 and as $124_1$-$124_2$ in FIG. 2) and some inverters (denoted as $202_1$-$202_2$ in FIG. 2), determined by six external control logic signals (denoted as S10, S11, S12, S20, S21, and S22 in FIG. 1). Roughly half of the control logic signals (e.g., control logic signals S10, S11, and S12 in FIG. 1) are used by the first output port $104_1$ to select one of the input ports 102, while the other half of the control logic signals (e.g., control logic signals S20, S21, and S22 in FIG. 1) are used by the second output port $104_3$ to select one of the input ports 102. The control logic signal denoted as SAN selects either the first output port $104_1$ or the second output port $104_3$ for the third, backup output port $104_2$.

Each switch in the third stage of switches 116 is coupled to one of a second set of back-end RF amplifiers $118_1$-$118_2$ (hereinafter collectively referred to as "amplifiers 118"). These amplifiers 118 provide additional signal power gain, as well as isolation between the first output port $104_1$ and the second output port $104_3$. Each of the amplifiers 118 is in turn coupled to one of a second set of power dividers $120_1$-$120_2$ (hereinafter collectively referred to as "power dividers 120").

A lone RF switch 122 selects either the first output port $104_1$ or the second output port $104_3$ for the third, backup output port $104_2$. In one embodiment, the RF switch 122 is an SP2T switch.

The relatively compact, single board layout of the 8×2 RF switch 100 does not require the connection of any internal coaxial cables when integrated into a satellite receiver. Because the lack of coaxial interconnection cables allows receiver space to be conserved, the switch 100 can be integrated in a compact satellite receiver (e.g., of approximately 1U rack height). In one embodiment, the housing size of the 8×2 RF switch 100 is approximately 6.5 inch long×4 inch wide×0.5 inch thick, which is smaller than the housing for a typical 8×1 switch. A 0.5 inch thickness is the minimum required to accept F connectors, and a 6.5 inch length is defined by equally spacing eight F connectors while allowing external cables to be screwed and unscrewed by human fingers. Moreover, the switch 100 is capable of changing seamlessly between transponders of a satellite receiver.

Figure 4:
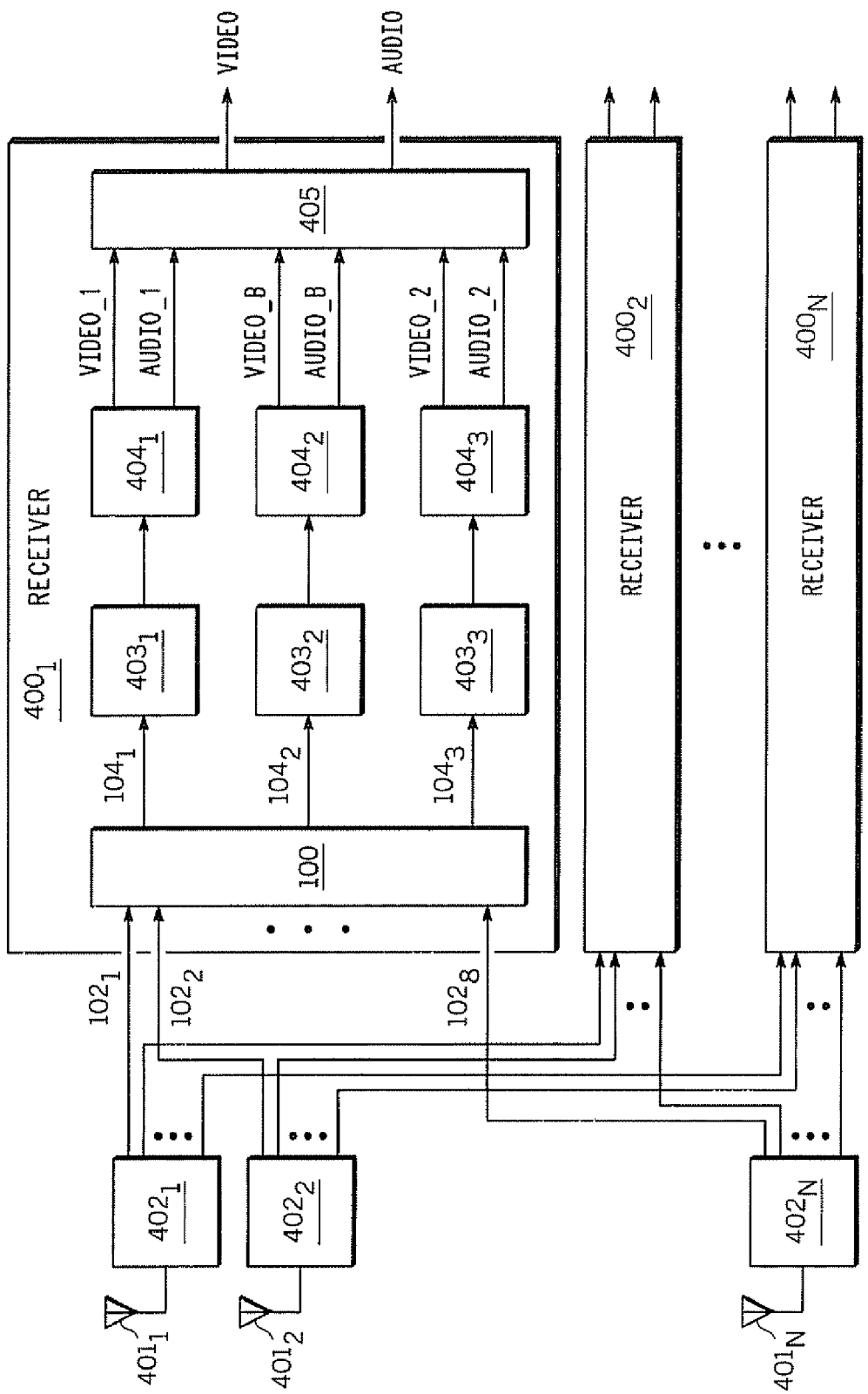
FIG. 4 is a simplified schematic diagram illustrating one embodiment of a satellite receiver incorporating the switch of FIG. 1.

FIG. 4 is a simplified schematic diagram illustrating one embodiment of a plurality of satellite receivers $400_1$-$400_N$ (hereinafter collectively referred to as "receivers 400") incorporating the RF switch 100 of FIG. 1. As illustrated, a plurality of power dividers $402_1$-$402_N$ (hereinafter collectively referred to as "power dividers 402") split the signals from a plurality of antennae $401_1$-$401_N$ (hereinafter collectively referred to as "antennae 401") into the receivers 400 (specifically into the input ports 102 of the switch 100). A plurality of tuners $403_1$-$403_3$ (hereinafter collectively referred to as "tuners 403") tune to satellite transponders from the output ports 104 of the switch 100. Specifically, a first tuner $403_1$ tunes to a first transponder from the first output port $104_1$; a second tuner $403_3$ tunes to a second transponder from the second output port $104_3$; and a third tuner $403_2$ tunes to a backup transponder from the third, backup output port $104_2$. The output of each tuner 403 is coupled to one of a plurality of demodulators $404_1$-$404_3$ (hereinafter collectively referred to as "demodulators 404").

Video signals and audio signals from the demodulators 404 are coupled to a video/audio switch 405. The video/audio switch 405 selects one pair of video and audio signals to provide satellite service. Because each tuner 403 is already tuned to a desired transponder, video and audio signals may be changed seamlessly without re-tuning the transponders.

In one embodiment, to reduce the DC power requirement, front-end amplifiers 106 are turned off if their respective signal paths are not selected. In this way, only one—or at most two—of the front-end amplifiers 106 are turned on at a time. In a further embodiment, ferrite beads (denoted in FIG. 1 as F1 and F2) and a capacitor (denoted in FIG. 1 as C1) pass +20 volts DC from the first output port $104_1$ to a first input port $102_1$. This provides DC power to external low-noise downconverters at the satellite antennae, but blocks high frequencies between the first input port $102_1$ and the first output port $104_1$.

Figure 2:
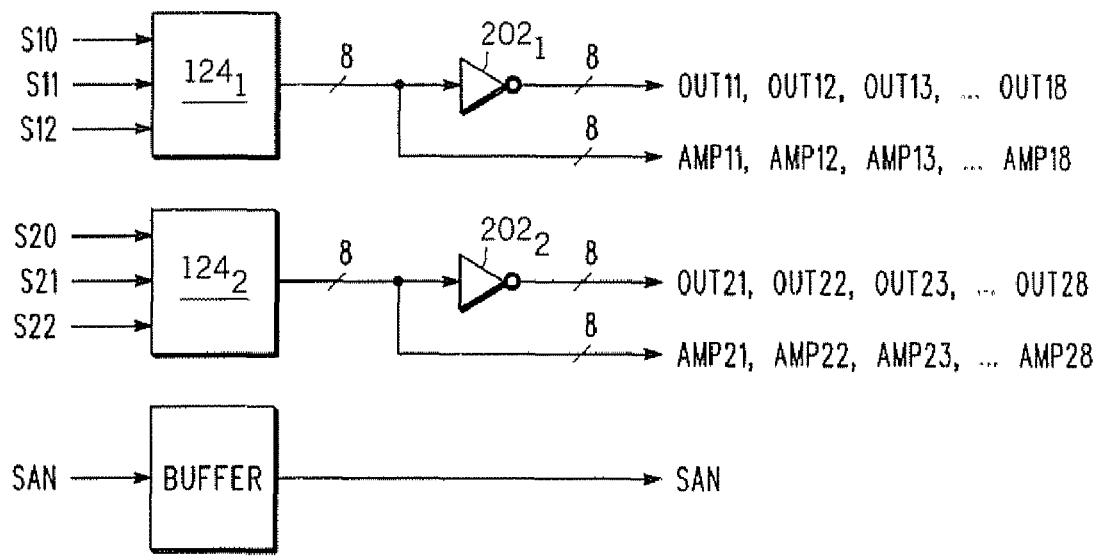
FIG. 2 illustrates on embodiment of a logic diagram corresponding to the switch illustrated in FIG. 1.

FIG. 2 illustrates on embodiment of a logic diagram 200 corresponding to the switch 100 illustrated in FIG. 1. As discussed above, roughly half of the control logic signals (e.g., control logic signals S10, S11, and S12 in FIGS. 1 and 2) select the input ports 102 for the first output port $104_1$, while the other half of the control logic signals (e.g., control logic signals S20, S21, and S22 in FIGS. 1 and 2) select the input ports 102 for the second output port $104_3$. The control logic signal SAN selects either the first output port $104_1$ or the second output port $104_3$ for the third, backup output port $104_2$. Tables 1 and 2, below, list the control logic for one embodiment of the first output port $104_1$ and one embodiment of the second output port $104_3$, respectively. Table 3 lists the control logic for one embodiment of the third, backup output port $104_2$.

TABLE 1

Logic controls for first output port $104_1$ selection

| RF input port to be selected | Logic signal S12 | Logic signal S11 | Logic signal S10 |
| --- | --- | --- | --- |
| $102_1$ | 0 | 0 | 0 |
| $102_2$ | 0 | 0 | 1 |
| $102_3$ | 0 | 1 | 0 |
| $102_4$ | 0 | 1 | 1 |
| $102_5$ | 1 | 0 | 0 |
| $102_6$ | 1 | 0 | 1 |
| $102_7$ | 1 | 1 | 0 |
| $102_8$ | 1 | 1 | 1 |

TABLE 2

Logic controls for second output port $104_3$ selection

| RF input port to be selected | Logic signal S22 | Logic signal S21 | Logic signal S20 |
|---|---|---|---|
| $102_1$ | 0 | 0 | 0 |
| $102_2$ | 0 | 0 | 1 |
| $102_3$ | 0 | 1 | 0 |
| $102_4$ | 0 | 1 | 1 |
| $102_5$ | 1 | 0 | 0 |
| $102_6$ | 1 | 0 | 1 |
| $102_7$ | 1 | 1 | 0 |
| $102_8$ | 1 | 1 | 1 |

TABLE 3

Logic controls for third output port $104_2$ selection

| Port A output | Logic signal SAN |
|---|---|
| $104_1$ | 0 |
| $104_3$ | 1 |

Figure 3:
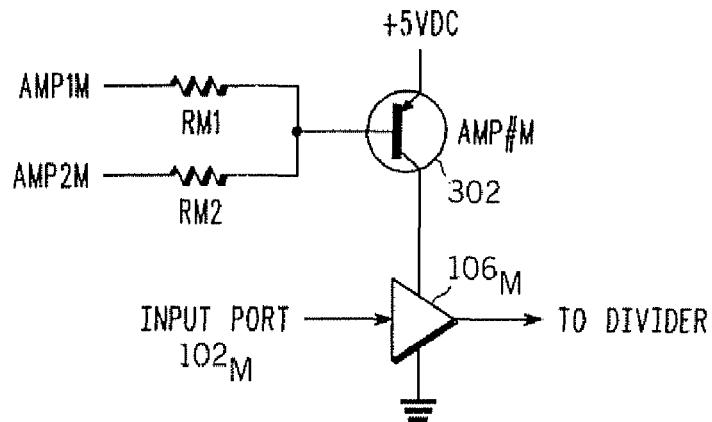
FIG. 3 illustrates a logic diagram for one embodiment of a front-end amplifier, as illustrated in FIG. 1.

FIG. 3 illustrates a logic diagram 300 for one embodiment of a front-end amplifier $106_M$, as illustrated in FIG. 1. The front-end amplifier $106_M$ is one representative of the amplifiers 106, and is coupled to a representative input port $102_M$. As illustrated, the amplifier $106_M$ receives a plurality of control logic signals. The control logic signal denoted as AMP1M enables the amplifier $106_M$ when AMP1M is at logical LOW and disables the amplifier $106_M$ when AMP1M is at logical HIGH. AMP1M is the inverted logic signal of OUT1M. Likewise, the control logic signal denoted as AMP2M enables the amplifier $106_M$ when AMP2M is at logical LOW and disables the amplifier $106_M$ when AMP2M is at logical HIGH. AMP2M is the inverted logic signal of OUT2M. A PNP transistor 302 is used to turn DC power to the amplifier $106_M$ on or off. The control logic signals AMP1M and AMP2M are connected to the base of the transistor 302, such that the transistor 302 is turned off if both of AMP1M and AMP2M are at logical HIGH.

As an exemplary use case, supposed that the first output port $104_1$ selects input port $102_3$, and the second output port $104_3$ selects input port $102_7$. Further suppose that all of OUT1M are LOW, except for OUT13, and that all of OUT2M are LOW, except for OUT27. Referring back to FIG. 1, the first stage of RF switches 112 will only pass input from input port $102_3$ for the first output port $104_1$ and input from input port $102_7$ for the second output port $104_3$. At the same time, all of AMP1M are HIGH, except for AMP13, and all of AMP2M are HIGH, except for AMP27. Thus, all of the front-end RF amplifiers 106 are turned off, except for the amplifier $106_3$ coupled to input port $102_3$ and the amplifier $106_7$ coupled to input port $102_7$. If both the first output port $104_1$ and the second output port $104_3$ select input port $102_3$, then all of the front-end amplifiers 106 are turned off, except for the amplifier $106_3$ coupled to input port $102_3$.

While the foregoing is directed to embodiments of the invention, other and further embodiments of the invention may be devised without departing from the basic scope thereof.

What is claimed is:

1. A radio frequency (RF) switch, comprising:
a plurality of RF input ports; and
a plurality of RF output ports, each of the plurality of RF output ports independently selecting a signal path from any one of the plurality of RF input ports,
where the plurality of RF input ports and the plurality of RF output ports are integrated in a single-board layout, and
wherein the plurality of RF output ports comprises at least one backup port that selects a signal path from a remainder of the plurality of RF output ports.

2. The radio frequency switch of claim 1, wherein the plurality of RF input ports is greater in number than the plurality of RF output ports.

3. The radio frequency switch of claim 2, wherein the plurality of RF input ports comprises eight RF input ports, and the plurality of RF output ports comprises three RF output ports.

4. The radio frequency switch of claim 1, wherein each of the plurality of RF output ports selects a signal path using combination logic.

5. The radio frequency switch of claim 1, wherein an amplifier is turned off if the amplifier is coupled to an RF input port providing a signal path that is not selected by one of the plurality of RF output ports.

6. The radio frequency switch of claim 1, wherein each of the plurality of RF output ports has unity insertion gain from a selected RF input port over a range of approximately 950 MHz to approximately 2150 MHz.

7. The radio frequency switch of claim 1, wherein a determination as to which of the plurality of RF input ports will provide the signal path to which of the plurality of RF output ports is made by a plurality of stages of RF switches.

8. The radio frequency switch of claim 7, wherein each switch in the plurality of stages of RF switches is controlled by a logic signal from a logic decoder.

9. The radio frequency switch of claim 1, further comprising:
a plurality of ferrite beads positioned between a first one of the plurality of RF input ports and a first one of the plurality of RF output ports; and
a capacitor positioned between the first one of the plurality of RF input ports and the first one of the plurality of RF output ports.

10. A satellite receiver, comprising:
at least one antenna for receiving a signal from a satellite transponder; and
a radio frequency switch for selecting the satellite transponder from among a plurality of satellite transponders, where the radio frequency switch comprises:
a plurality of input ports; and
a plurality of output ports, each of the plurality of output ports independently selecting a signal path from any one of the plurality of input ports,
where the plurality of input ports and the plurality of output ports are integrated in a single-board layout, and
wherein the plurality of output ports comprises at least one backup port that selects a signal path from a remainder of the plurality of output ports.

11. The satellite receiver of claim 10, wherein the plurality of input ports is greater in number than the plurality of output ports.

12. The satellite receiver of claim 11, wherein the plurality of input ports comprises eight input ports, and the plurality of output ports comprises three output ports.

13. The satellite receiver of claim 10, wherein each of the plurality of output ports selects a signal path using combination logic.

14. The satellite receiver of claim 10, wherein an amplifier of the radio frequency switch is turned off if the amplifier is coupled to an input port providing a signal path that is not selected by one of the plurality of output ports.

15. The satellite receiver of claim 10, wherein each of the plurality of output ports has unity insertion gain from a selected input port over a range of approximately 950 MHz to approximately 2150 MHz.

16. The satellite receiver of claim 10, wherein a determination as to which of the plurality of input ports will provide the signal path to which of the plurality of output ports is made by a plurality of stages of radio frequency switches.

17. The satellite receiver of claim 16, wherein each switch in the plurality of stages of radio frequency switches is controlled by a logic signal from a logic decoder.

18. The satellite receiver of claim 10, wherein the radio frequency switch further comprises:
- a plurality of ferrite beads positioned between a first one of the plurality of input ports and a first one of the plurality of output ports; and
- a capacitor positioned between the first one of the plurality of input ports and the first one of the plurality of output ports.

* * * * *